United States Patent [19]

Lin

[11] Patent Number: 5,281,492

[45] Date of Patent: Jan. 25, 1994

[54] COVER DEVICE OF A STORAGE BATTERY

[75] Inventor: Hsien-Chin Lin, Tainan City, Taiwan

[73] Assignee: Ztong Yee Industrial Co., Ltd., Tainan Hsien, Taiwan

[21] Appl. No.: 54,603

[22] Filed: Apr. 29, 1993

[51] Int. Cl.⁵ .................... H01M 2/04; H01M 2/12
[52] U.S. Cl. ...................... 429/84; 429/88; 429/175; 429/177
[58] Field of Search ............ 429/175, 88, 87, 84, 429/177

[56] References Cited

U.S. PATENT DOCUMENTS 4,087,592  5/1978  Okazaru et al. ............ 429/88 X
4,916,034  4/1990  Hulsebus et al. ............ 429/175 X

FOREIGN PATENT DOCUMENTS

3219551  9/1991  Japan .

*Primary Examiner*—John S. Maples
*Attorney, Agent, or Firm*—Harness, Dickey & Pierce

[57] ABSTRACT

A cover device for a storage battery includes a sub-cover that includes a flat bottom with a plurality of first vent-holes, a top portion and a connecting wall which interconnects the flat bottom and the top portion to define a space therein. The cover device further includes a plurality of tubes, each of which having n open end which is connected to each of the first vent-holes of the flat bottom and a closed end which is plugged into a respective inlet-hole of a main cover of the storage battery so as to close the inlet-hole, and a second vent-hole which is formed in the sub-cover and which communicates the space in the sub-cover with an exterior of the same.

5 Claims, 8 Drawing Sheets

(PRIOR ART)

COVER DEVICE OF A STORAGE BATTERY

BACKGROUND OF THE INVENTION

1. Field of the Invention

The invention relates to a cover device, more particularly to the cover device of a storage battery.

2. Description of the Related Art

Figure 1:
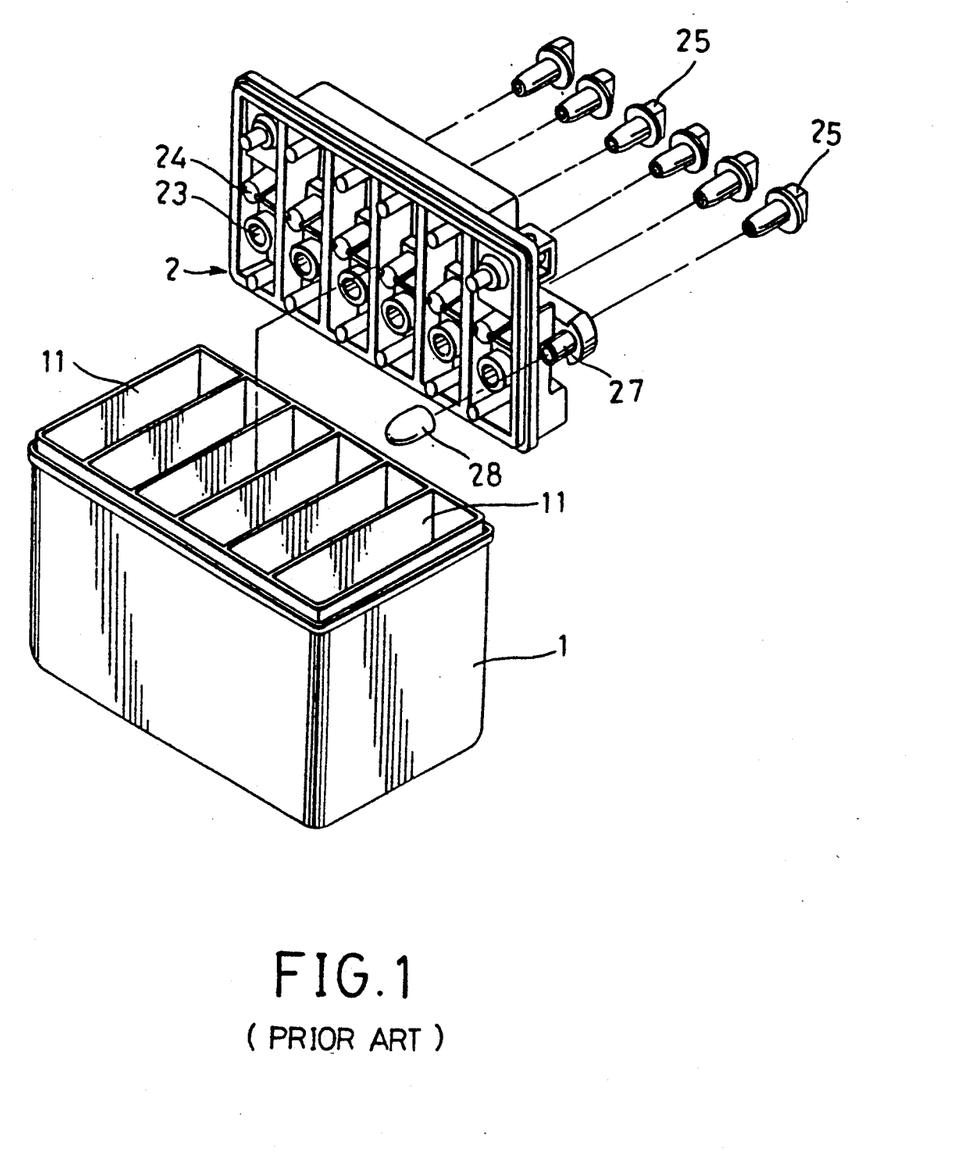
FIG. 1 shows an exploded view of a conventional storage battery.
Figure 2:
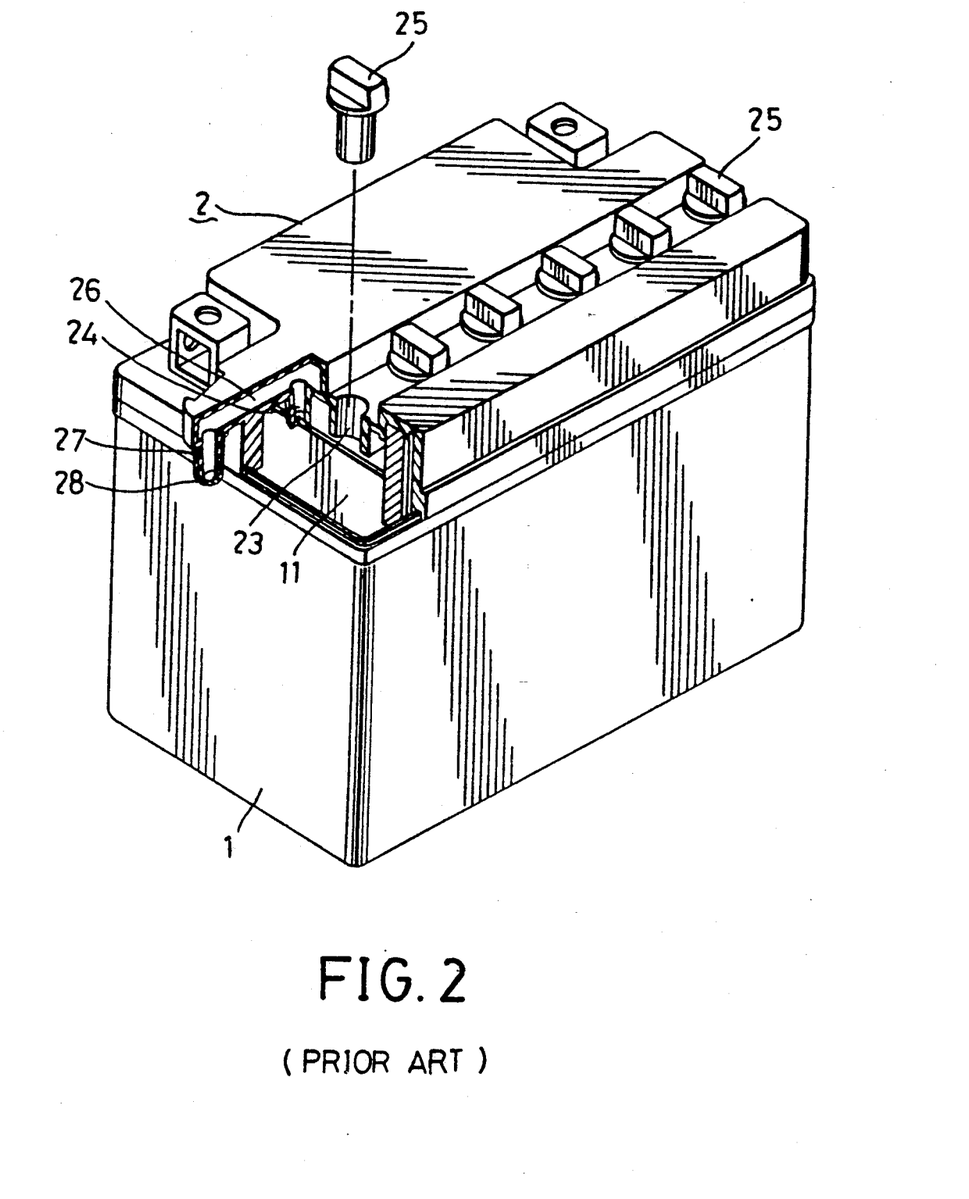
FIG. 2 is a cut-away view of the conventional storage battery to depict the configuration of the cover device of the same.

Referring to FIG. 1, a conventional storage battery is shown to comprise a container (1) that has a plurality of separate rectangular-shaped compartments (11) for receiving electrodes and a main cover (2) provided securely on the container (1) to close a top portion of the container (1). As best illustrated in FIG. 2, the main cover (2) confines a space (26) therein and has a flat bottom which is formed with a plurality of inlet-holes (23) therethrough for filling an electrolytic solution, such as dilute sulfuric acid, into the separate compartments (11) and a plurality of sub-cover units (25) for closing the inlet-holes (23). The main cover (2) further has a plurality of gas inlets (24) which are also formed in the flat bottom and which permit the gas that is produced in each of the compartments (11) to flow into the space (26) and out of a gas outlet (27) which extends outside the periphery of the main cover (2).

During mass production, a sheath (28) is provided hermetically on a free end of the gas outlet (27) and the inlet-holes (23) of the main cover (2) are sealed by aluminum foils (not illustrated) with the use of a hot melting process. Thus, the metal plates inside the storage battery are isolated from the exterior of the same so as to prevent oxidation action within the storage battery.

In use, the aluminum foils are removed first so as to permit pouring of the dilute sulfuric acid into the respective compartments (11) via the inlet-holes (23) of the main cover (2). The inlet-holes (23) are closed by the sub-cover units (25) after the filling operation. However, the user often forgets to remove the sheath (28) that seals hermetically the free end of the gas outlet (27) of the main cover (2). Thus, when the storage battery is electrically connected so as to provide light, the flow of current inside the storage battery causes electrolysis, i.e., bubbles of gas are produced on the electrodes. The gas accumulates within the storage battery and cannot escape to an exterior of the same through the gas inlets (24), the space (26) and the gas outlet (27). The accumulated gas eventually leads to an explosion and may endanger the persons nearby.

SUMMARY OF THE INVENTION

A main objective of the present invention is to provide a cover device for a storage battery which has gas outlets that are not sealed, thereby eliminating the aforementioned drawback.

According to the present invention, a cover device for a storage battery includes a main cover which is provided on a container of the storage battery and which has a plurality of inlet-holes formed therethrough and a sub-cover. The sub-cover includes a flat bottom, a top portion and a connecting wall which interconnects the flat bottom and the top portion to define an enclosed space therein. The sub-cover is further provided with a plurality of first vent-holes through the flat bottom, a second vent-hole which communicates the space to an exterior of the sub-cover, and a plurality of first tubes. Each of the first tubes has an open end that is connected to a respective one of the first vent-holes in the sub-cover and a closed end which is plugged into each of the inlet-holes in the main cover so as to close the inlet-holes. Each of the closed ends of the first tubes has an opening which communicates the space to a respective one of the compartments formed in the storage battery.

With this modification, the user does not have to close each of the inlet-holes. A storage battery provided with a cover device of the present invention will not explode since the gas cannot accumulate within the same.

BRIEF DESCRIPTION OF THE DRAWINGS

Other features and advantages of the present invention will become more apparent in the following detailed description of the preferred embodiments with reference to the accompanying drawings, in which.

DETAILED DESCRIPTION OF THE PREFERRED EMBODIMENTS

Figure 3:
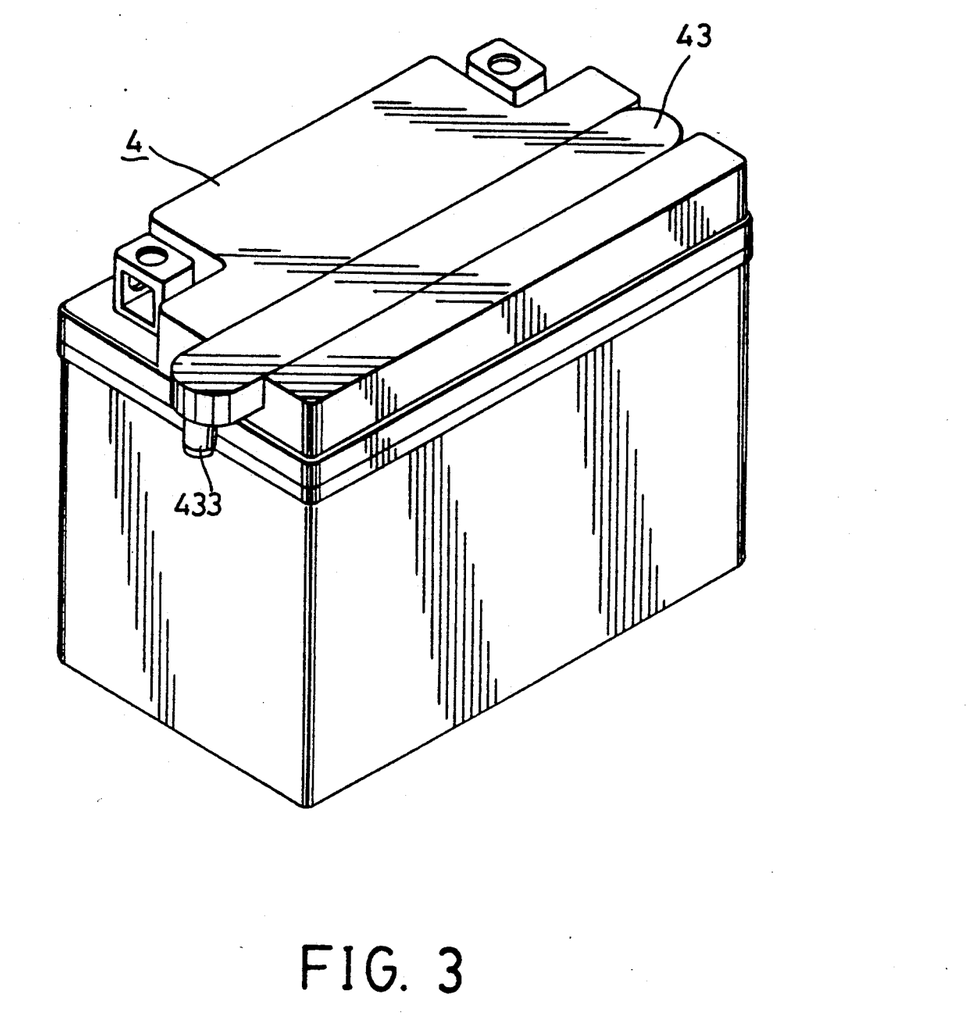
FIG. 3 is a perspective view of a storage battery which is equipped with a cover device of the present invention.

Referring to FIG. 3, a storage battery of this invention includes a container (3) that has a plurality of compartments (31) and a main cover (4) which is provided securely on the container (3) so as to seal a top portion thereof. A plurality of inlet-holes (42) are formed through the main cover (4) for filling an electrolytic solution into the respective one of the compartments (31).

Figure 4:
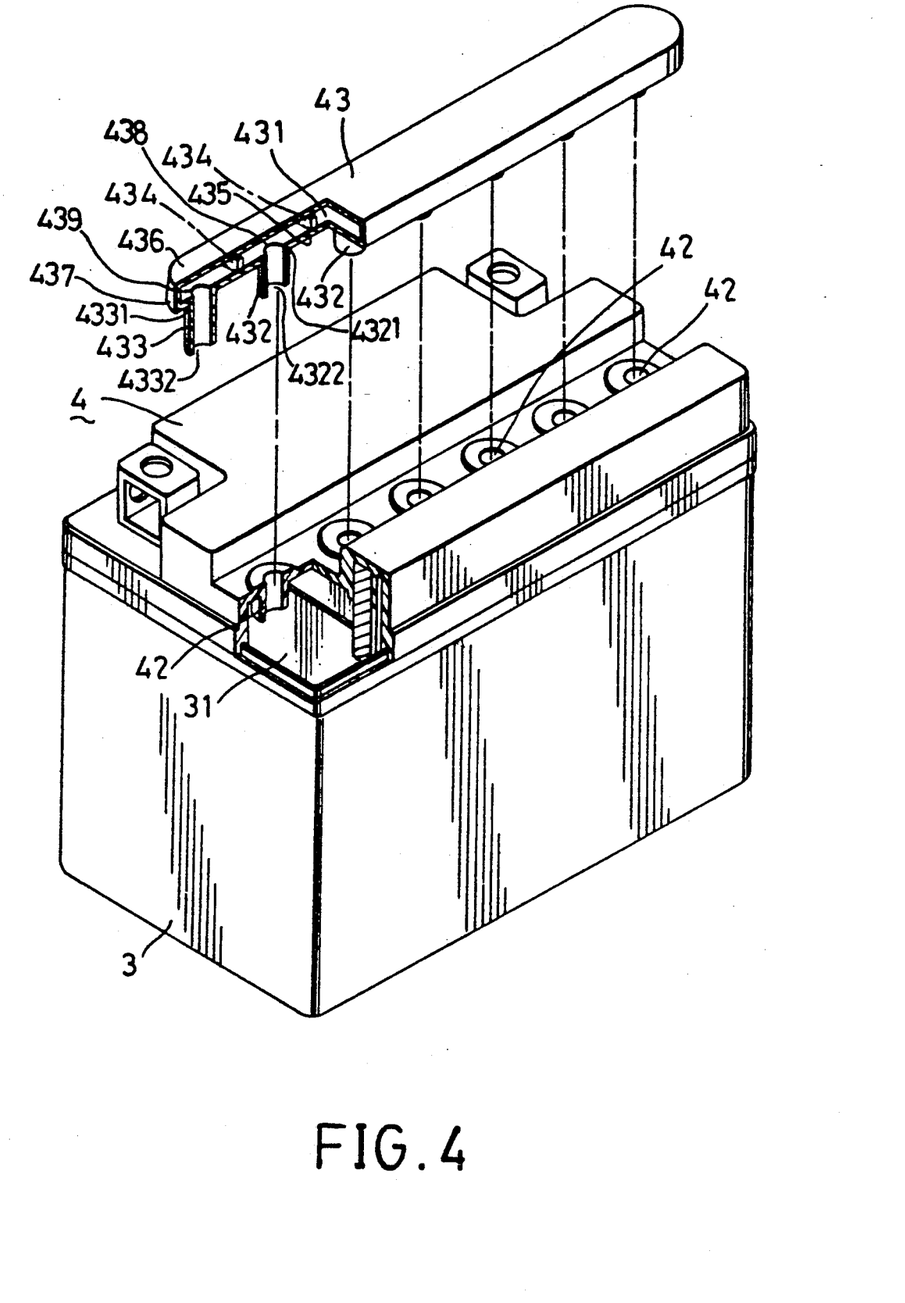
FIG. 4 depicts a cut-away view of the storage battery shown in FIG. 3.
Figure 5:
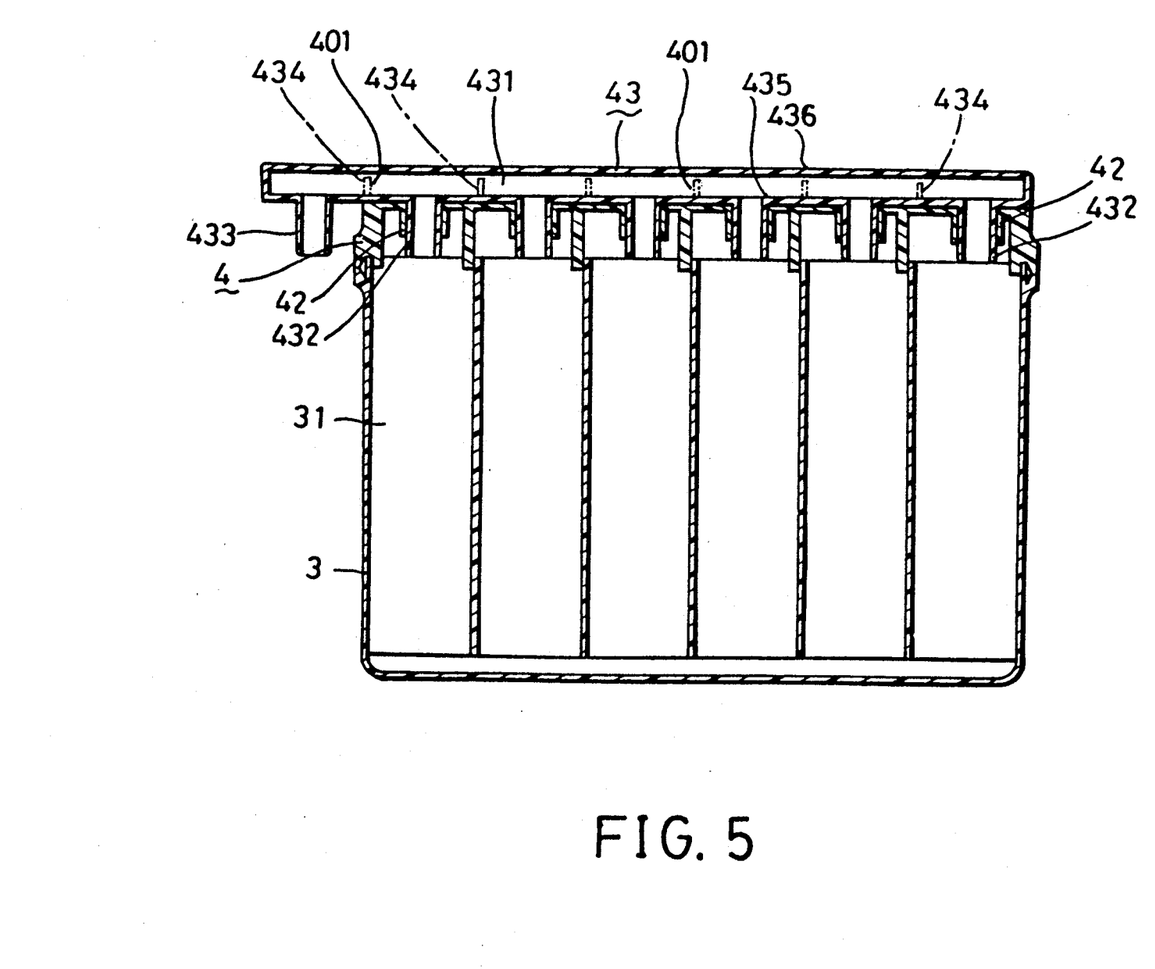
FIG. 5 shows a cross sectional view of a first preferred embodiment of the storage battery with the cover device of the present invention.

Referring to FIGS. 3 and 4, according to the present invention, an elongated sub-cover (43) is provided on the main cover (4) for closing the inlet-holes (42). The sub-cover (43) includes a flat bottom portion (435), a flat top portion (436) and a connecting wall (437) which interconnects the flat bottom (435) and the top portions (436) to define a space (431) therein. The sub-cover (43) is provided with a plurality of first vent-holes (438) formed through the flat bottom portion (435), a second vent-hole (439), and a plurality of first tubes (432). Each of the first tubes (432) has an open end (4321) which is connected to the first vent-hole (438) of the flat bottom (435) of the sub-cover (43) and a closed end (4322) which is plugged into a respective one of the inlet-holes (42) so as to close the inlet-holes (42) in the main cover (4). Since an opening formed in the closed end (4322) of the first tube (432) is equal to an inner diameter of the same, the first tube (432) is hollow throughout the length thereof. Thus, the space (431) of the sub-cover (4) is communicated with each of the compartments (31) via the first tube (432). In this preferred embodiment, the sub-cover (43) has a portion that extends beyond the periphery of the main cover (4), and the second vent-hole (439) is formed in the extended portion. A second tube (433) with two open ends is connected to the second vent-hole (439) so that the second tube (433) is disposed outside the periphery of the main cover (4), as shown in FIG. 5. Thus, the space (431) of the sub-cover (43) is communicated with the exterior of the same via the second tube (433).

Referring to FIG. 5, the sub-cover (43) further has a plurality of partitions (434), each of which is provided across the side wall (437) and is transverse to a longitudinal length of the elongated sub-cover (4). Each of the partitions (434) and is disposed between adjacent every two of the first tubes (432) such that a clearance (401) is formed right below the flat top portion (436). Thus, the risk of sputtering of the electrolytic solution from one of the compartments (31) to an adjacent compartment (31) and out of the second tube (433) due to vibration of the container (3) can be dramatically reduced by the partitions (434) of the sub-cover (43). The gas which is produced due to electrolysis in each of the compartments (31) of the container (3) can escape to the exterior of the storage battery through the clearance (401) and the second tube (433) when the storage battery that is equipped with a cover device of the present invention is in use.

Figure 6:
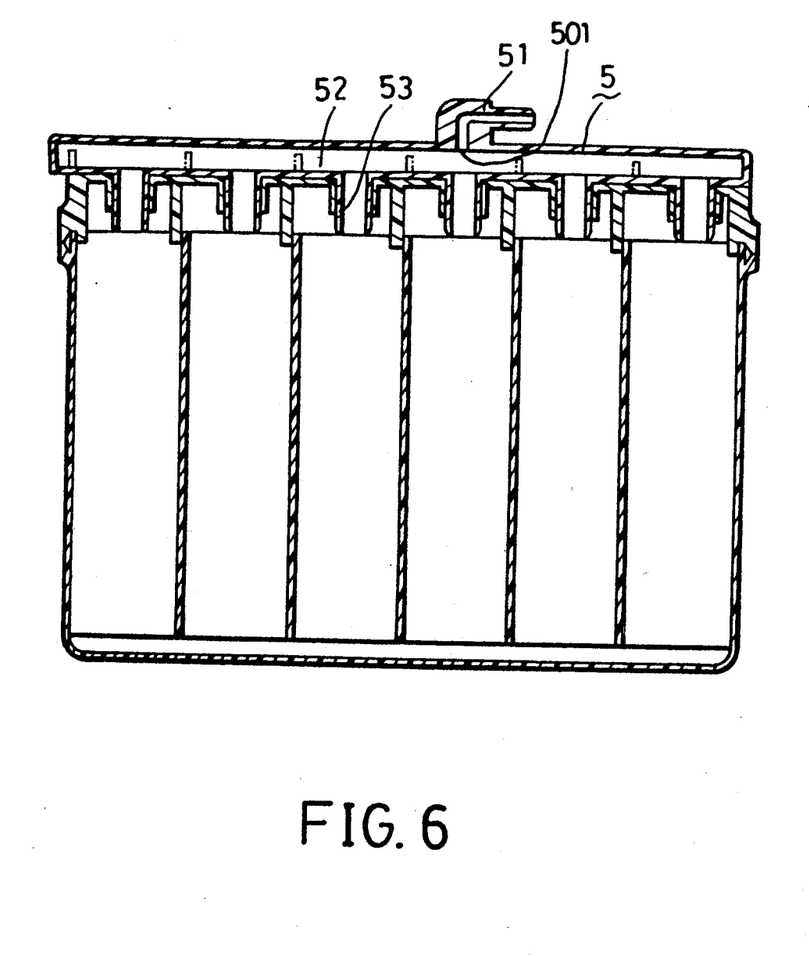
FIG. 6 shows a cross sectional view of a second preferred embodiment of the storage battery with the cover device of the present invention.

In an alternative embodiment, the second vent-hole (501) is formed in the flat top portion of the sub-cover (5). An L-shaped tube (51) is correspondingly connected to a second vent-hole (501) which is formed in the flat top portion of the sub-cover (4), as shown in FIG. 6.

Since the second tube (43) and the L-shaped tube (51) for releasing the gas within the storage battery are formed in the sub-cover (43), no sheath is required, unlike that in the prior art. Furthermore, since the inlet-holes (42) in the main cover (4) are sealed with aluminum foils during the mass production, the user only needs to remove the aluminum foils before using the storage battery. Thus, the compartments (31) in the storage battery is in constant communication with an exterior of the same after the sub-cover of the present invention is plugged into the inlet-holes of the main cover. The gas, that is produced, cannot accumulate within the storage battery, thereby eliminating the danger of explosion in the storage battery due to gas accumulation therein. The object and feature of the present invention are therefore achieved.

Figure 7:
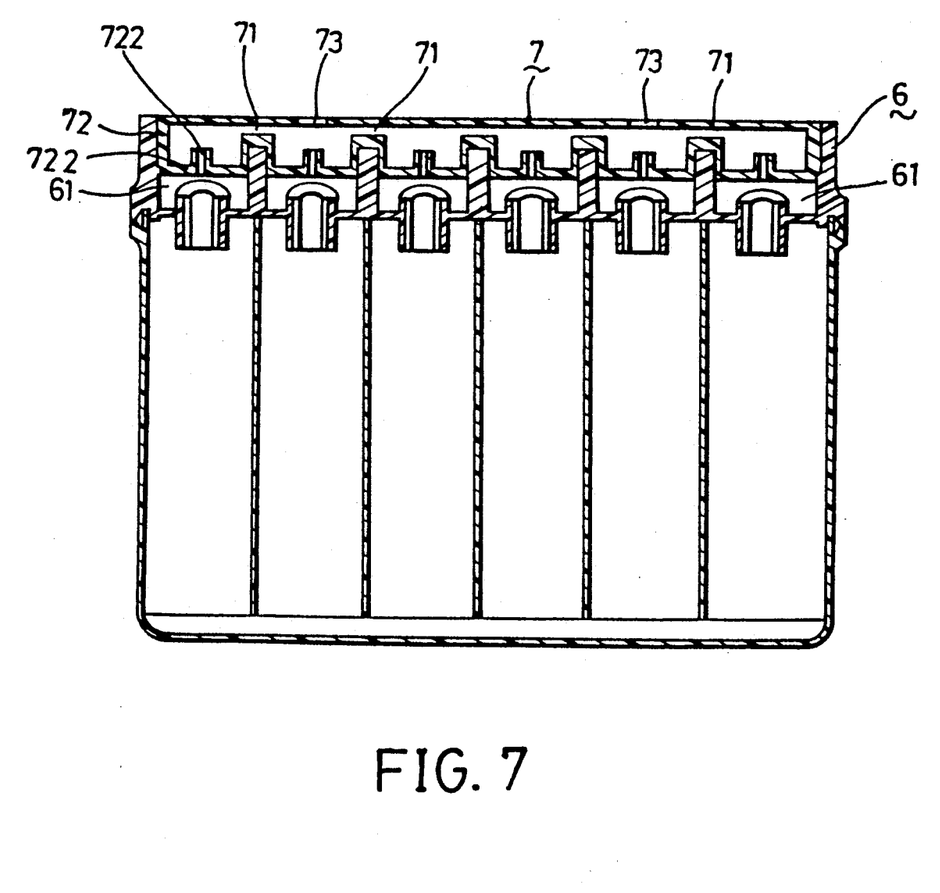
FIG. 7 shows a cross sectional view of a third preferred embodiment of the storage battery with the cover device of the present invention.
Figure 8:
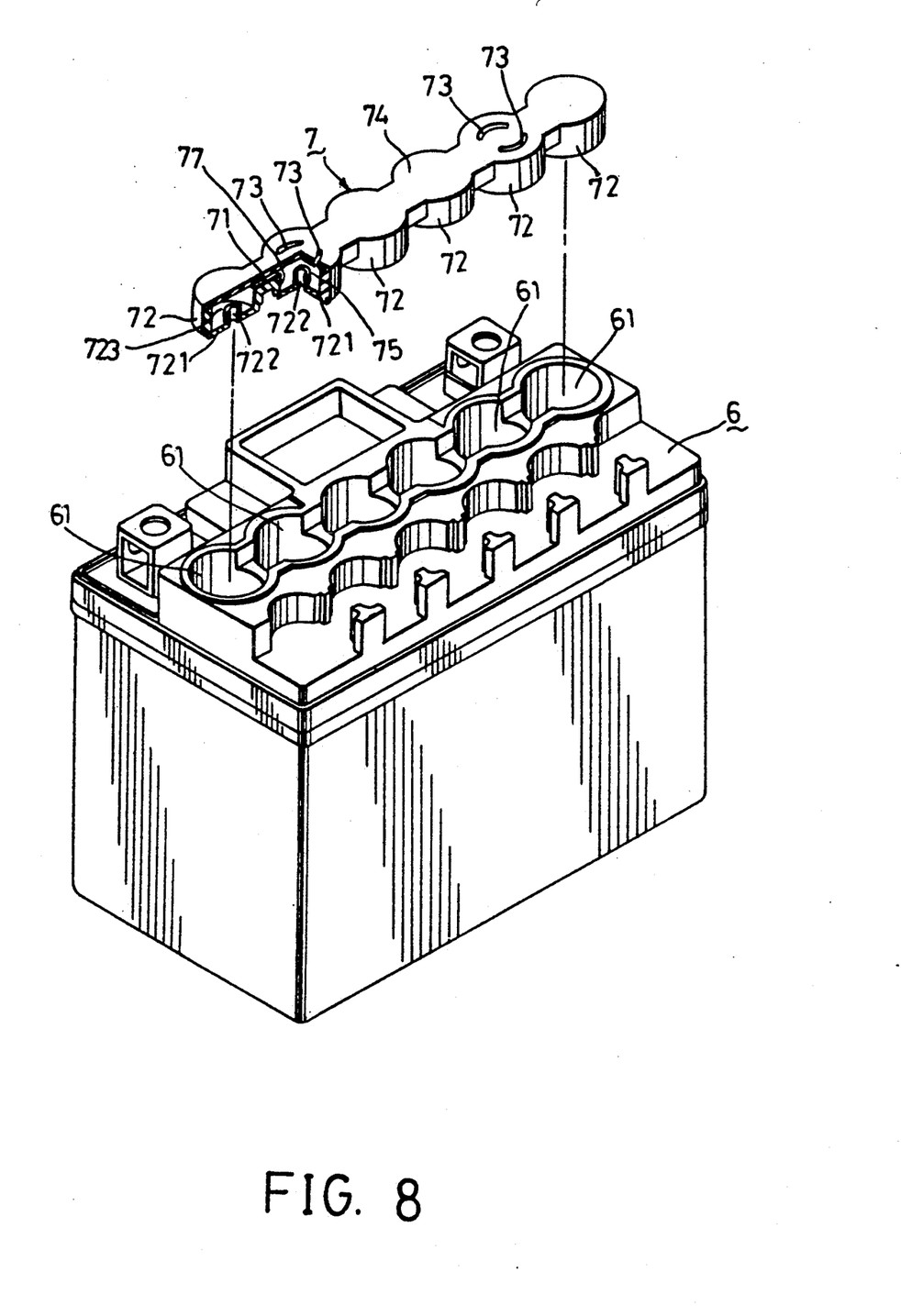
FIG. 8 shows a detailed view of the cover device of the present invention.

Referring to FIGS. 7 and 8, in another preferred embodiment of the present invention, the sub-cover is an elongated casing (7) which confines a space (71) therein and which includes a flat top portion (74), a flat bottom portion (77) which is located close to the flat top portion (74), a plurality of first vent-holes (75) formed through the flat bottom portion (77), and a plurality of first tubes (72). Each of the first tubes (72) has an open end (723) connected to the first vent-hole (75) and a closed end (721) with an opening (722) which communicates an interior (71) of the elongated casing (7) and each of the compartments in a storage battery after the first tubes (72) are plugged into the inlet-holes (61) of the storage battery so as to close the same. A plurality of curve-shaped second vent-holes (73) are formed through the flat top portion (74) and communicate the interior space (71) of the elongated casing (7) to an exterior of the same. The flat bottom portion (77) is located close to the flat top portion (74) of the elongated casing (7) so as to prevent sputtering of an electrolytic solution between adjacent two of the compartments and to permit flow of gas between the adjacent two compartments. Thus, the interior of the storage battery is in constant communication with an exterior of the same via the elongated casing (7) so that gas does not accumulate within the storage battery. An explosion due to gas accumulation inside the battery is; can therefore be, prevented.

While preferred embodiments have been illustrated and described, it will be apparent that many changes and modifications may be made in the general construction and arrangement of the present invention without departing from the spirit and scope thereof. Therefore, it is desired that the present invention be not limited to the exact disclosure but only to the extent of the appended claims.

I claim:

1. A cover device for a storage battery which has a plurality of compartments, said cover device comprising:
a main cover having a plurality of inlet-holes each of which being aligned with a respective one of said compartments, and a sub-cover which has a flat bottom portion, a top portion opposite to said flat bottom portion and a connecting wall that interconnects said flat bottom portion and said top portion to define a space therein, said sub-cover further having a plurality of first vent-holes formed through said flat bottom, a second vent-hole which communicates said space to an exterior of said sub-cover, and a plurality of first tubes, each of which having an open end connected to each of said first vent-holes in said flat bottom portion and a closed end which is plugged into each of said inlet-holes in said main cover so as to close said inlet-holes, each of said closed ends of said first tubes having an opening formed therein to which permit communication between each of said compartments and said space inside said sub-cover.

2. The cover device as defined in claim 1, wherein said sub-cover further includes an L-shaped tube with two open ends, said second vent-hole being formed in said top portion of said sub-cover, one end of L-shaped tube being connected to said second vent-hole.

3. The cover device as defined in claim 1, wherein said sub-cover includes an extended portion which extends beyond the periphery of said main cover so as to be disposed outside the periphery of said main cover and a second tube which has two open ends, said second vent-hole being formed in said extended portion, said second tube being connected to said second vent-hole.

4. The cover device as defined in claim 1, wherein said second vent-hole is formed through said top portion and has a curved shape when said second vent-hole is viewed from above.

5. The cover device as defined in claim 1, wherein said sub-cover further includes a plurality of partitions, each of which being disposed between adjacent two of said first tubes and extending from said flat bottom portion, each of said partitions terminating adjacent to a topmost section of said top portion so as to prevent an electrolytic solution in one of said compartments from sputtering into an adjacent one of said compartments.

* * * * *